(12) United States Patent
Oda

(10) Patent No.: US 10,149,147 B2
(45) Date of Patent: Dec. 4, 2018

(54) TERMINAL DEVICE, TERMINAL CONFIGURATION SYSTEM, AND TERMINAL CONFIGURATION METHOD

(71) Applicant: ICOM INCORPORATED, Osaka-shi, Osaka (JP)

(72) Inventor: Yuma Oda, Osaka (JP)

(73) Assignee: ICOM INCORPORATED, Osaka-shi, Osaka (JP)

( * ) Notice: Subject to any disclaimer, the term of this patent is extended or adjusted under 35 U.S.C. 154(b) by 0 days.

(21) Appl. No.: 15/531,218

(22) PCT Filed: Nov. 27, 2015

(86) PCT No.: PCT/JP2015/083486
§ 371 (c)(1),
(2) Date: May 26, 2017

(87) PCT Pub. No.: WO2016/084959
PCT Pub. Date: Jun. 2, 2016

(65) Prior Publication Data
US 2017/0332228 A1    Nov. 16, 2017

(30) Foreign Application Priority Data
Nov. 28, 2014    (JP) .................................. 2014-241906

(51) Int. Cl.
*H04W 36/00* (2009.01)
*H04W 8/22* (2009.01)
(Continued)

(52) U.S. Cl.
CPC ........... *H04W 8/22* (2013.01); *H04M 1/2535* (2013.01); *H04M 1/72563* (2013.01);
(Continued)

(58) Field of Classification Search
CPC ..... H04W 36/08; H04W 36/12; H04W 36/14; H04W 36/18; H04W 36/0055; H04W 28/16; H04W 76/02
(Continued)

(56) References Cited

U.S. PATENT DOCUMENTS 8,264,993 B2 * 9/2012 Noh .................. H04W 52/0274
370/311
8,565,689 B1 * 10/2013 Rubin ..................... G06F 11/00
370/232
2012/0003973 A1 * 1/2012 Tseng .................... H04W 48/18
455/426.1

OTHER PUBLICATIONS

International Search Report of PCT/JP2015/083486.
(Continued)

*Primary Examiner* — Huy C Ho
(74) *Attorney, Agent, or Firm* — Muncy, Geissler, Olds & Lowe, P.C.

(57) ABSTRACT

[Problem] To provide a communication system for simplifying terminal device configuration.
[Solution] A communication system comprises a server and a terminal device. The server stores first information in order for the terminal device to communicate, and stores second information in order for the terminal device to connect to a network of the other bases. When the power is turned on in a normal operation, the terminal device connects to the network by using network information in a non-volatile memory unit, obtains the first information from the server, and writes the same in a volatile memory unit. Thus, the terminal device starts operation. When the power is turned on by using a particular operation, the terminal device connects to the network by using the network information in the non-volatile memory unit, obtains network information of the other bases from the server, and stores the same in the
(Continued)

non-volatile memory unit. Thus, it is possible to connect to the network of the other bases.

5 Claims, 13 Drawing Sheets

(51) Int. Cl.
| | |
|---|---|
| *H04W 84/12* | (2009.01) |
| *H04W 36/14* | (2009.01) |
| *H04W 36/36* | (2009.01) |
| *H04M 1/253* | (2006.01) |
| *H04W 48/16* | (2009.01) |
| *H04M 1/725* | (2006.01) |
| *H04W 4/10* | (2009.01) |
| *H04W 4/50* | (2018.01) |

(52) U.S. Cl.
CPC ........... *H04W 36/14* (2013.01); *H04W 36/36* (2013.01); *H04W 48/16* (2013.01); *H04W 84/12* (2013.01); *H04M 1/72522* (2013.01); *H04M 2250/06* (2013.01); *H04W 4/10* (2013.01); *H04W 4/50* (2018.02)

(58) Field of Classification Search
USPC ....................................................... 455/435.1
See application file for complete search history.

(56) References Cited

OTHER PUBLICATIONS

ICOM, IP Advanced Radio System, LT 14GS005D, Japan, retrieved from http://www.icomamerica.com/en/downloads/DownloadDocument.aspx?Document=785 on May 17, 2017.

\* cited by examiner

TRX TABLE

| TRX NUMBER | SERVER INFORMATION | NETWORK INFORMATION | TARGET | ASSIGNED FLAG | MAC ADDRESS |
|---|---|---|---|---|---|
| 030 | IP ADDRESS AND THE LIKE | (OWN BASE) | STATIC | ○ | ..... |
| ⋮ | ⋮ | ⋮ | ⋮ | ⋮ | ⋮ |
| 090 | IP ADDRESS AND THE LIKE | (OWN BASE) | DYNAMIC | × | ..... |
| 091 | — | OTHER BASE1 | DUMMY | — | — |
| ⋮ | ⋮ | ⋮ | ⋮ | ⋮ | ⋮ |
| 100 | — | OTHER BASE10 | DUMMY | — | — |

TERMINAL CONFIGURATION TABLE

| | TRX NUMBER | TERMINAL NUMBER (call No.) | CONFIGURED FLAG | TERMINAL CONFIGURATION INFORMATION |
|---|---|---|---|---|
| FOR MANUAL ASSIGNMENT | 001 | 1 | ○ | ..... |
| | 002 | 2 | ○ | ..... |
| | ⋮ | ⋮ | ⋮ | ⋮ |
| | 030 | 30 | × | ..... |
| FOR AUTOMATIC ASSIGNMENT | 031 | 101 | ○ | ..... |
| | 032 | 102 | × | ..... |
| | ⋮ | ⋮ | ⋮ | ⋮ |
| | 100 | 170 | × | ..... |

Fig. 6

TERMINAL (REGISTRATION) TABLE

| TERMINAL NUMBER | TRX NUMBER | ACTIVE FLAG | IP ADDRESS | CONNECTING AP |
|---|---|---|---|---|
| 1 | 001 | ○ | 192.168.0.65 | 192.168.0.11 |
| 2 | 002 | ○ | 192.168.0.66 | 192.168.0.12 |
| ⋮ | ⋮ | ⋮ | ⋮ | ⋮ |
| 130 | 100 | × | | |

Fig. 7

| GROUP ID | BELONGING TERMINAL (CALLING TARGET TERMINAL) |
|---|---|
| 0010 | 1, 2, 3, 4, 5 |
| 0011 | 3, 4, 5, 6, 7 |
| ⋮ | ⋮ |

Fig. 8

MIXING TABLE

| SESSION NUMBER | CALLING TERMINAL | PARTICIPATING TERMINAL | RETENTION TIME (TS) |
|---|---|---|---|
| 0012 | 9 | 6,7,8,10 | 1500 |
| 0013 | 23 | 1,3,4,5,23 | 1500 |
| 19 | 2 | 2,19 | 1500 |

Fig. 9

| DESTINATION IP ADDRESS | TRANSMISSION SOURCE IP ADDRESS | DATA BODY | | | |
|---|---|---|---|---|---|
| | | VOICE SIGNAL | COMMUNICATION CONTROL INFORMATION | | |
| | | | CALLING TYPE | CALLING ID | SOURCE ID |

Fig. 10

TERMINAL DEVICE, TERMINAL CONFIGURATION SYSTEM, AND TERMINAL CONFIGURATION METHOD

TECHNICAL FIELD

The present invention relates to facilitation of relocation of a terminal device in a communication system using a network such as a wireless LAN.

BACKGROUND ART

As illustrated in Non-Patent Literature 1, a wireless LAN transceiver system which is a voice communication system utilizing the wireless LAN has been put into practice. In this system, a plurality of the terminal devices and a server are connected via a wireless LAN (local area network), a relaying function of the server enables voice communication between terminal devices. The terminal device has a shape resembling a handy transceiver and realizes a communication form such as full-duplex communication or group communication by making use of characteristics of the wireless LAN with an impression from use not different from conventional wireless communication.

CITATION LIST

Non-Patent Literature

[Non-Patent Literature 1] "IP ADVANCED RADIO SYSTEM", Icom Incorporated, Internet <https://www.icom.co.jp/products/network/ip_advanced_radio_system/>

SUMMARY OF INVENTION

Technical Problem

On the other hand, since the aforementioned voice communication system is a system utilizing a wireless LAN, configuration corresponding to each device is needed for enabling connection of each device to the network or communication between each of the devices. In the case of using a large number of the terminal devices, configuration is needed for each terminal device, and a work load is increased. Moreover, if the terminal device is relocated among a plurality of bases (voice communication systems) or in the case of the terminal device used by a user relocated among the plurality of bases, for example, since the configuration is different depending on the base, the configuration needs to be changed in accordance with the base every time the terminal device is relocated, which is cumbersome.

Thus, the present invention has an object to facilitate relocation of the terminal device between the bases in the communication system using the network such as a wireless LAN.

Solution to Problem

A terminal device of the present invention comprises a network communication unit for processing communication over a network, a control unit having a volatile storage unit and a rewritable non-volatile storage unit, and an operation unit. The volatile storage unit stores terminal configuration information. The non-volatile storage unit stores network information for connection to the network. When power is turned on by a first procedure of the operation unit, the control unit reads out the network information from the non-volatile storage unit and connects to the network so as to make an access to a server on the network, to obtain the terminal configuration information, and to write it in the volatile storage unit. When the power is turned on by a second procedure of the operation unit, the control unit reads out the network information from the non-volatile storage unit and connects to the network so as to make an access to the server, to obtain second network information for connection to a second network different from the network, and to overwrite and store it in the non-volatile storage unit.

The present invention is effective when the terminal device is relocated among a plurality of voice communication systems as below. The voice communication system has:

a first voice communication system having:
   a first relaying server installed on a first network and relaying voice communication between terminal devices connected to the first network;
   a first provisioning server for supplying terminal configuration information to the terminal device; and
   a first assignment server for giving identification information to the terminal device and for providing first server information for making an access to the first provisioning server to the terminal device; and
a second voice communication system having:
   a second relaying server installed on a second network and relaying voice communication between the terminal devices connected to the second network;
   a second provisioning server for supplying the terminal configuration information to the terminal device; and
   a second assignment server for giving the identification information to the terminal device and for providing second server information for making an access to the second provisioning server to the terminal device. The second network information for connecting to the second network is stored in the first assignment server, and with respect to the terminal device, the second network information is written in the first network. As a result, when this terminal device is used in the second voice communication system, rapid connection to the second network can be made so as to make an access to the second assignment server.

Advantageous Effect of Invention

According to the present invention, configuration at start of the terminal device is facilitated, and manual configuration at each base when the terminal device is relocated among the bases is no longer necessary.

BRIEF DESCRIPTION OF THE DRAWINGS

FIG. 6 is a diagram illustrating a terminal configuration table configured in a relaying server.

FIG. 7 is a diagram illustrating a terminal registration table configured in the relaying server.

FIG. 8 is a diagram illustrating a group table configured in the relaying server.

FIG. 9 is a diagram illustrating a mixing table configured in the relaying server.

FIG. 10 is a diagram illustrating an example of configuration of a voice packet.

DETAILED DESCRIPTION OF THE EMBODIMENT

Figure 1:
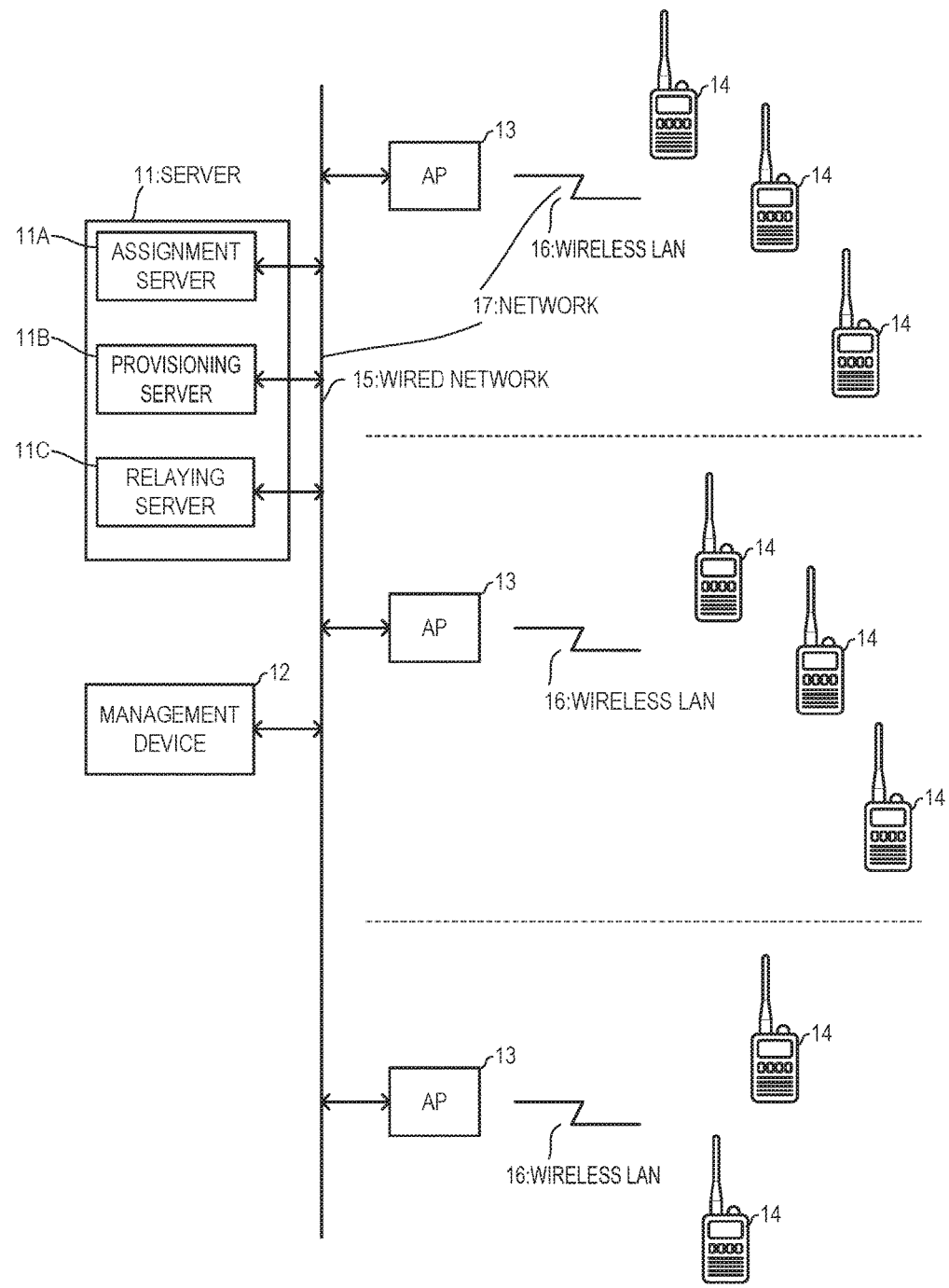
FIG. 1 is a configuration diagram of a voice communication system which is an embodiment of the present invention.
Figure 2:
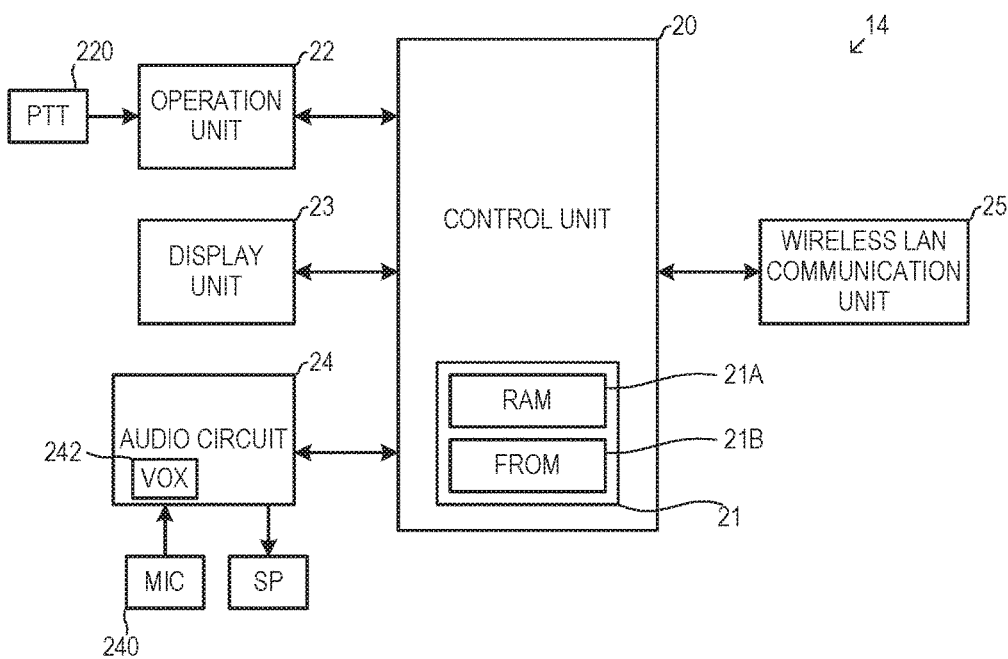
FIG. 2 is a block diagram of a terminal device.

A voice communication system of the present invention will be described by referring to the attached drawings. FIG. 1 is a configuration diagram of the voice communication system which is an embodiment of the present invention. In this voice communication system, a plurality of terminal devices 14 communicate with each other by using a wireless LAN (local area network) 16 such as Wi-Fi. The terminal device 14 has a shape resembling a handy transceiver for wireless communication and comprises a PTT (push-to-talk) switch 220 as illustrated in FIG. 2. The terminal device 14 is a wireless network device for transmitting/receiving a voice packet via a wireless access point (AP) 13 in view of a function. A server 11 having a relaying function relays mutual communication via a wired network 15 and the wireless LAN 16 of the plurality of terminal devices 14. It should be noted that, hereinafter, the wired network 15 and the wireless LAN 16 are collectively called a network 17.

As the wired network 15, Ethernet (registered trademark) LAN or the Internet can be used. If the Internet is included in the wired network 15, safe communication can be conducted by using VPN (virtual private network). As the wireless LAN 16, communication methods conforming to IEEE802.11 such as Wi-Fi can be applied. The terminal device 14 and a wireless access point 13 conduct communication with the communication method of this wireless LAN 16. In FIG. 1, three units of the wireless access points 13 are installed, but the number of the wireless access points 13 in this voice communication system is not limited.

The server 11 and a management device 12 are connected to the wired network 15. The server 11 has an assignment server function in charge of assignment of TRX numbers, a provisioning server function for enabling operation by configuring data required for the terminal device 14, and a relaying server function for relaying a voice signal. Hereinafter, for facilitation of understanding, the assignment server function of the server 11 shall be referred to as an assignment server 11A, the provisioning server function to a provisioning server 11B, and the relaying server function to a relaying server 11C. It is needless to say that one or all of the assignment server 11A, the provisioning server 11B, and the relaying server 11C may consist of another piece of hardware. The assignment server 11A automatically assigns a TRX number which is an identification code of the terminal device 14 in this voice communication system to the terminal device 14. The relaying server 11C relays communication between the terminal devices 14. Details of processing of the server 11 will be described later. The management device 12 consists of a personal computer or the like in which a management program is installed. The management device 12 makes an access to the server 11 in accordance with an operation by an administrator and configures a table and the like illustrated in FIGS. 5 to 8 in the server 11. Moreover, the management device 12 communicates with the terminal device 14 via a USB and the like and writes information illustrated in FIG. 3A in the terminal device 14.

In this voice communication system, the relaying server 11C receives a voice packet (RTP packet) transmitted without an advance notice from the terminal device 14 and on the basis of communication control information written in this voice packet, delivers a voice signal of this packet to the terminal device 14 of a communication partner. As a result, despite the voice communication via the network 17, a communication establishment procedure such as the SIP procedure is not necessary. That is, in this voice communication system, a user does not have to make a calling operation such as dialing but only needs to turn on the PTT switch 220 of the terminal device 14 and to talk toward a microphone 240 so that this voice signal is transmitted to the terminal device 14 of the communication partner. As a result, the user can conduct the voice communication over the network with an impression from use similar to the transceiver of conventional wireless communication.

In this voice communication system, the terminal device 14 is capable of communicating in communication forms of individual communication, group communication, and plenary communication. The individual communication is a one-to-one communication form conducted by the single terminal device 14 (calling terminal device) by calling another single terminal device 14. The group communication is a form in which the calling terminal device 14 calls a group, and mutual communication is conducted among the terminal devices belonging to the group. The plenary communication is group communication targeted to all the terminal devices 14 in which the calling terminal device 14 calls all, and mutual communication is conducted among all the terminal devices.

Figure 3A:
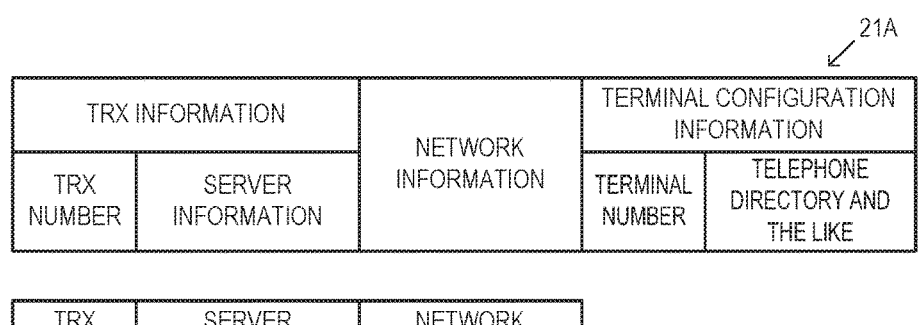
FIG. 3A is a diagram illustrating a storage area configured in a storage unit of the terminal device.

FIG. 2 is a block diagram of the terminal device 14. As described above, the terminal device 14 is a wireless network device for transmitting/receiving a voice packet via the wireless access point (AP) 13 of the wireless LAN in view of a function. The control unit 20 consists of a microprocessor and controls the operation of the terminal device 14. The control unit 20 has a storage unit 21 in which data illustrated in FIG. 3A is stored. The storage unit 21 has a RAM 21A and a flash ROM 21B. The RAM 21A is used as a work memory during the operation. The flash ROM (FROM) 21B is used for storing information such as TRX information and network information in a non-volatile manner. To the control unit 20, an operation unit 22, a display unit 23, an audio circuit 24, and a wireless LAN communication unit 25 are connected. The operation unit 22 includes key switches such as the PTT switch 220 and receives an operation by the user and inputs its operation signal into the control unit 20. The display unit 23 includes a liquid crystal display. On the liquid crystal display, a terminal number/group number of the communication partner selected by the operation by the user and the terminal number/group number of the communication partner of incoming communication and the like are displayed.

The audio circuit 24 has the microphone 240 and a speaker 241. The control unit 20 decodes the received voice packet and inputs it into the audio circuit 24. The audio circuit converts this decoded audio signal to an analog signal and outputs it from the speaker 241. The audio circuit 24 also converts the voice signal input from the microphone 240 to a digital signal and inputs it into the control unit 20. The control unit 20 makes this digital audio signal packetize to a voice packet and inputs it to the wireless LAN communication unit 25. The wireless LAN communication unit 25 has a circuit conducting wireless communication in the communication methods conforming to IEEE802.11. The wireless LAN communication unit 25 transmits the packet input from the control unit 20 to the wireless access point 13. By means of the aforementioned functions, when the user utters voice toward the microphone 240 while pressing on the PTT switch 220, this voice signal is edited into the voice packet and transmitted to the relaying server 11C. Moreover, the wireless LAN communication unit 25 inputs the packet received from the relaying server 11C via the wireless access point 13 into the control unit 20.

The terminal device 14 has a VOX circuit 242 together with the PTT switch 220. The VOX circuit 242 is a circuit which determines whether a talking voice (voice signal) of the user has been input or not on the basis of an input level of the microphone 240 and its duration and if it is determined that the talking voice has been input, switches the device to the same communication state as the case where the PTT switch 220 is turned on. The terminal device 14 carries out switching between transmission on/off by mode configuration on the basis of either one of or both of turning-on of the PTT switch 220 and the VOX circuit 242.

Although a general wireless communication transceiver is that of a simplex type which cannot receive a wireless signal in a transmission state, the terminal device 14 is capable of full-duplex type communication which conducts transmission and reception of the voice signal at the same time. This function is realized by a fact that the terminal device 14 is a network communication terminal transmitting/receiving a voice packet at a high speed over the network 17. However, the terminal device 14 edits and transmits the voice packet only when a talking voice is input by the function of the PTT switch 220 or of the VOX circuit 242 so that a soundless voice packet is not continuously transmitted even if the full-duplex communication is carried out.

Figure 3B:
FIG. 3B is a diagram illustrating an example of storage contents of an FROM of the terminal device.
Figure 3C:
FIG. 3C is a diagram illustrating an example of storage contents of an FROM of the terminal device.

The terminal device 14 has a storage area illustrated in FIG. 3A in the RAM 21A and the flash ROM 21B. In the flash ROM 21B, the TRX information and the network information are stored in a non-volatile manner. The TRX information includes a TRX number and the server information. The TRX number is the identification code of the terminal device 14 in the voice communication system as described above, and numerical values of 1 to 100 are used in this embodiment and any one of them is assigned to each of the terminal devices 14 operated in the voice communication system. The server information is information for accessing the server 11 and includes an IP address and a password. Moreover, the network information is information for making an access to the network 17 (wireless LAN 16) and includes SSID and authentication information (WEP and the like). These TRX information and network information have contents as illustrated in FIG. 3B, for example, and when the terminal device 14 is powered on, it is read out of the flash ROM 21B and written in the RAM 21A. Moreover, as illustrated in FIG. 3C, the TRX information may be blank. In this case, when the terminal device 14 is powered on, the terminal device 14 is connected to the network 17 on the basis of the network information and makes an access to the assignment server 11A so as to obtain the TRX number and the server information. That is, if the TRX number is blank (Null) indicating automatic assignment (AUTO), the terminal device 14 automatically obtains the TRX information from the assignment server 11A. The obtained TRX number and server information are not written in the flash ROM 21B but are written only in the RAM 21A. Therefore, this content is cleared when the power is turned off.

As described above, assignment methods of the TRX number include manual assignment in which the TRX number is written in the flash ROM 21B manually by the management device 12 as in FIG. 3B and automatic assignment in which nothing is written (Null is written) in the flash ROM 21B but the TRX number is assigned to the RAM 21A by the assignment server 11A as in FIG. 3C. Moreover, the automatic assignment includes static assignment in which the TRX number determined in advance is assigned to each of the terminal devices 14 and dynamic assignment in which the TRX number which is free at that time is assigned in order. The static assignment is performed by using a MAC address. The MAC address of the terminal device 14 is associated with a predetermined TRX number and registered in the assignment server 11A, and when the terminal device 14 accesses the assignment server 11A (assignment request), the assignment server 11A assigns the TRX number reserved for the terminal device 14 by collating the MAC address. In the dynamic assignment, when an assignment request is made, the assignment server 11A assigns the TRX number which is free at that time to the terminal device 14, but the MAC address of the terminal device 14 assigned in the past in association with each of the TRX numbers is stored, and the assignment server 11A assigns the same TRX number as that in the previous time to the terminal device 14 as much as possible.

The terminal device 14 makes an access to the provisioning server 11B by using the TRX information written in the RAM 21A. The provisioning server 11B carries out provisioning to the terminal device 14 when it is accessed by the terminal device 14. The provisioning is processing of transmitting terminal configuration information including the terminal number and an update program to the terminal device 14. As a result, the terminal device 14 is set up to an operable state. The terminal device 14 makes an access to the relaying server 11C with a given terminal number and requests registration. The relaying server 11C registers this terminal device 14 and enables relaying of this voice signal. The registration of the terminal device 14 is made by setting an active flag corresponding to this terminal number in a terminal registration table (see FIG. 7). The terminal number is used as a calling code for calling the terminal device 14. The terminal configuration information includes the terminal number of this terminal device 14, a telephone directory listing the terminal numbers of the other terminal devices 14 and group numbers of communication groups. A value of the terminal number is arbitrary as long as it consists of four or less alphanumeric characters and unique to each of the terminal devices 14. At appropriate timing after that, the terminal device 14 requests update of the registration from the relaying server 11C. The appropriate timing after that means every certain time, timing when the wireless access point 13 in connection is switched and the like.

When the terminal device 14 transmits a voice signal to the relaying server 11C, the terminal device 14 creates a voice packet in which its own terminal number and a terminal number (or a group number) of the communication partner are added to the voice signal and transmits it. Configuration of the voice packet will be described later.

Figures 4, 5:
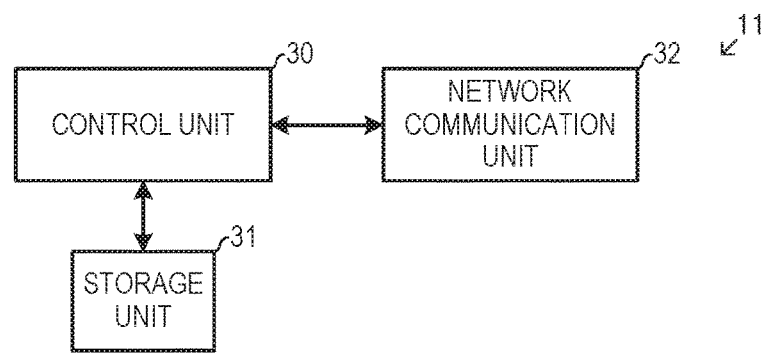
FIG. 4 is a block diagram of a server.
FIG. 5 is a diagram illustrating a TRX table configured in an assignment server.

FIG. 4 is a block diagram of the server 11. The server 11 has a control unit 30, a storage unit 31, and a network communication unit 32. The storage unit 31 consists of a hard disk, a RAM: and the like, for example. The network communication unit 32 controls communication with the wired network 15. In the storage unit 31 of the server 11, various tables illustrated in FIGS. 5 to 9 are configured. The control unit 30 of the server 11 assigns a free TRX number to the terminal device 14 which transmitted an assignment request, carries out provisioning to the terminal device 14 and also carries out mixing and transfer of the voice signal transmitted from the terminal device 14.

FIG. 5 is a diagram illustrating a TRX table configured in the storage unit 31 of the assignment server 11A. The TRX table is a table for automatically assigning the TRX information including the TRX number to the terminal device 14 to which the TRX number has not been manually assigned. In the TRX table, TRX numbers which can be assigned to the terminal devices 14 are stored. In association with each of the TRX numbers, storage areas are provided for the server information, network information, assignment target information, assigned flags, and MAC addresses. The assignment target information is information indicating that the TRX number is reserved in advance for the specific terminal device 14 (static assignment), that it has not been reserved (dynamic assignment) or it is a dummy TRX number for transmission of the network information. The static assignment is an assignment form in which the TRX number has been reserved in advance for the specific terminal device 14 and the TRX number is fixedly assigned to the terminal device 14. The dynamic assignment is an assignment form in which an assignment destination of the TRX number has not been fixed, and a free TRX number is assigned in order to the terminal device 14 which made an assignment request. The dummy TRX number is associated with the network information of other bases, and the network information of the base of a relocation destination is provided to the terminal device 14 by using this TRX number as will be described later (see FIGS. 16 and 17). The server information is information such as an IP address or a password for accessing the server 11 (provisioning server 11B). The network information is information such as BSSID or a password for making an access to the network 17 (wireless LAN 16). In items of the server information of the TRX numbers for the dynamic assignment and for the static assignment, the information of the server 11 of this voice communication system is stored. Moreover, in the items of the network information of the dummy TRX numbers, information for connecting to the networks of the other bases (other voice communication systems) is stored. In the items of the network information of the TRX numbers for the dynamic assignment and for the static assignment, there is no need to write the network information, but the network information of its own base (this voice communication system) may be written. Moreover, in the items of the server information of the dummy TRX numbers, the server information of the other bases corresponding to the network information does not have to be written since an access is made again to the assignment sever 11A at the base of the relocation designation, but the server information of the other bases or the server information of its own base may be written.

The assigned flag is a flag indicating that the TRX number has been assigned to the terminal device 14 at present and is set by the assignment server 11A when the TRX number is assigned to the terminal device 14. In the item of the MAC address, the MAC address of (the wireless LAN communication unit 25 of) the reserved terminal device 14 is written in the case of the statically assigned TRX number. In the case of the dynamically assigned TRX number, the MAC address of the terminal device 14 to which the TRX number is assigned is stored in the item of the MAC address. Once the TRX number is assigned, and when an assignment request is made again from the terminal device 14 which is inactivated after that, the same TRX number is assigned as much as possible by searching the table with that MAC address. It should be noted that the dummy TRX number is not included in writing targets of assigned flags and MAC addresses. When all the TRX numbers have been assigned to the terminal devices 14 (at least once) and there is no more blank TRX number, if a new assignment request is made, the oldest item among those not active at present is reset and assigned to the terminal device 14 for which the request was made this time. It should be noted that, if the terminal device 14 to which the TRX number was automatically assigned is made inactive, that fact is notified to the assignment server 11A from the relaying server 11C. Moreover, if time during which the terminal device 14 is inactive continues for predetermined time or more, the assignment server 11A may determine that a lease period to the terminal device 14 has been finished and reset the assigned flag of the TRX number which has been assigned to the terminal device 14.

FIG. 6 is a diagram illustrating a terminal configuration table configured in the storage unit 31 of the provisioning server 11B. The terminal configuration table is used during provisioning to the terminal device 14. In the terminal configuration table, the terminal number (calling code) configured to the terminal device 14 of the TRX number and configuration data for each TRX number are stored. The configuration data includes update data (firmware) of the program, a telephone directory recording the terminal numbers of other communicable terminal devices 14, groups to which it belongs and the like. Moreover, a flag indicating that the terminal device 14 with that number has been configured in correspondence with each of the TRX numbers is stored. The TRX numbers are for 100 units numbered from 1 to 100, and in this configuration, 1 to 30 are used for TRX numbers for manual assignment. Moreover, 31 to 100 are used for TRX numbers for automatic assignment. In the TRX table in FIG. 5, the TRX numbers for automatic assignment are registered. It should be noted that the TRX numbers with 91 to 100 are numbers for dummy assignment as illustrated in FIG. 5.

FIG. 7 is a diagram illustrating the terminal registration table provided in the storage unit 31 of the relaying server 11C. The terminal registration table is a table for the relaying server 11C to manage the terminal device 14. Each of the terminal devices 14 is identified by the terminal number which is the calling number uniquely assigned to each. In the terminal registration table, the TRX number, an active flag, an IP address, and an identification code (IP address) of the wireless access point 13 in connection of the terminal device 14 are stored for each of the terminal numbers. The active flag is a flag indicating that the terminal device 14 has accessed the relaying server 11C and completed registration and is communicable. It should be noted that, in the server 11, the terminal configuration table for provisioning (FIG. 6) and the terminal registration table for registration (FIG. 7) may be combined into one table. It should be noted that, a part of or the whole of the TRX information and the terminal configuration information corresponds to the first information of the present invention.

The provisioning server 11B executes processing of provisioning to the terminal device 14 when a provisioning request is received from the terminal device 14. When provisioning is completed, the terminal device 14 makes an access to the relaying server 11C and requests registration. The relaying server 11C writes the IP address in the terminal registration table and sets the active flag, and registers that it is in a communicable state. Moreover, the relaying server 11C communicates with the terminal device 14 at appropriate timing after that and updates the registration of the terminal device 14. The appropriate timing after that means every certain time, timing when the wireless access point 13 in connection is switched and the like.

The relaying server 11C further comprises a group table and a mixing table in order to control communication between the terminal devices 14 (transfer of a voice signal). FIG. 8 is a diagram illustrating the group table. The group table is a table for the relaying server 11C to manage the group. Each of the groups is identified by an ID (group number) uniquely assigned to each. In the group table, the group number and the terminal number of the terminal devices 14 (belonging terminal devices) belonging to the group are stored for each group.

FIG. 9 is a diagram illustrating the mixing table (session table). The mixing table is a table for the relaying server 11C to manage a communication session. The communication session is a communication state among a plurality of the terminal devices 14 using the relaying server 11C as a relaying device. The mixing table has a plurality of rows, and information for one communication session is stored in each row. The relaying server 11C determines from which of the communication sessions the voice signal comes by referring to the mixing table when it receives the voice signal (voice packet) from the terminal device 14.

When the relaying server 11C receives a calling voice packet which is a first voice packet from the terminal device 14, the communication session based on this voice packet is registered in the mixing table.

In the mixing table, items for a session number, a calling terminal number, a participating terminal number, and remaining retention time (T1) are provided for each communication session. The session number is a number for identifying this communication session. The calling terminal number is a terminal number of the terminal device 14 (calling terminal device) which transmitted the first voice packet (calling voice packet) of this communication session. As the session number, a communication partner identification number written in the calling voice packet is used. The communication session for which the terminal number is registered as the session number ("19", for example) is the communication session of the individual communication. The individual communication is one-to-one communication between the individual terminal devices 14. The communication session for which the group number is registered as the session number ("0012", for example) is the communication session of the group communication. The group communication is communication in which a plurality of the terminal devices 14 (three or more in general) mutually exchange voice signals.

The participating terminal number is a list of the terminal numbers of the terminal devices 14 participating in this communication session. When a voice packet is transmitted from one of the terminal devices 14 whose terminal number is registered in the participating terminal number, the control unit 30 transfers this voice packet to another terminal device 14 whose terminal number is registered in the participating terminal number and realizes mutual communication between the participating terminal devices.

In the case of the group communication session, the participating terminal numbers are the terminal number of the calling terminal device and the terminal number of the terminal device 14 belonging to the group specified by the communication partner.

The retention time is time held without canceling this communication session in a state where the voice packet is not transmitted from the participating terminal device. The retention time of each communication session in the relaying server 11C is set to 30 seconds, for example. A retention time timer (TS) of the mixing table is a timer for counting elapse of the retention time if a voice packet is not transmitted. The retention time timer TS is counted down if the voice packet is not transmitted and is reset to 30 seconds if the voice packet is transmitted in processing by the control unit 30 (see FIG. 15). When the voice packet is not sent for 30 seconds from the participating terminal device and the timer TS's time is up, this communication session is cancelled, and the information of this communication session is erased from the mixing table.

Moreover, in order for the communication session to be continued, the retention time needs to be counted also in each of the terminal devices 14. The retention time (T1) of the terminal device 14 is shorter than the retention time (TS=30 seconds) of the relaying server 11C and is set to 5 seconds, for example, in a timer T1. When 5 seconds have elapsed since the PTT switch 220 was turned off, even if the communication session is maintained in the relaying server 11C, the user can start another communication session by a predetermined operation.

The voice packet has configuration as illustrated in FIG. 10. The voice packet is made of a header and a data body (payload). The header includes a destination IP address (destination address) and a transmission source address (sender address). In the case of the voice packet transmitted from the terminal device 14 to the relaying server 11C, the destination IP address is an IP address of the relaying server 11C, and the transmission source address is an IP address of the terminal device 14. In the case of the voice packet transmitted from the relaying server 11C to the terminal device 14, the destination IP address is the IP address of the terminal device 14, and the transmission source address is the IP address of the relaying server 11C. The data body contains communication control information together with digitized voice signals. The communication control information includes a calling type, a calling ID and a source ID. The calling type is information for identifying a communication type (individual communication, group communication, plenary communication) of this voice packet. The calling ID is information for identifying the communication partner (target device), and in the case of the individual communication, the terminal number of the terminal device 14 is used, while in the case of the group communication, the group number of the group is used.

The source ID is information indicating a source of the voice signal. In the case of the voice packet transmitted from the terminal device 14 to the relaying server 11C, the terminal number of the terminal device 14 is written in the source ID. The voice signal made into a voice packet and transmitted from the terminal device 14 is transferred onto another voice packet in the relaying server 11C and is transferred to the terminal device 14 of the communication partner. In the terminal device 14 of the communication partner, too, the terminal ID of the terminal device 14 which transmitted the voice signal is written in the source ID of the voice packet transferred from the relaying server 11C to the terminal device 14 so that the source of the received voice signal is known. In the case of the group communication, a signal in which the voice signals received from the plurality of terminal devices 14 are mixed is packetized and transferred to the terminal device 14 in some cases, but the source ID of this voice packet may be cleared, or the group number may be written therein.

In the case of the group communication, the voice signals received from the plurality of terminal devices 14 participating in the group communication are mixed and transferred to each of the terminal devices 14 participating in the group communication. In this case, the mixing is carried out separately for each of the terminal devices 14 so that the voice signal transmitted by each terminal device 14 is not returned to itself. That is, to the terminal device 14 which has not transmitted a voice signal, the signal in which all the received voice signals are mixed is transferred, while to the terminal device 14 which transmitted the voice signal, the voice signal transmitted by the terminal device 14 is removed and the voice signal in which the other voice signals are mixed is transferred. As a result, an echo of the voice signal transmitted by the terminal device 14 is not generated therein.

Figure 11:
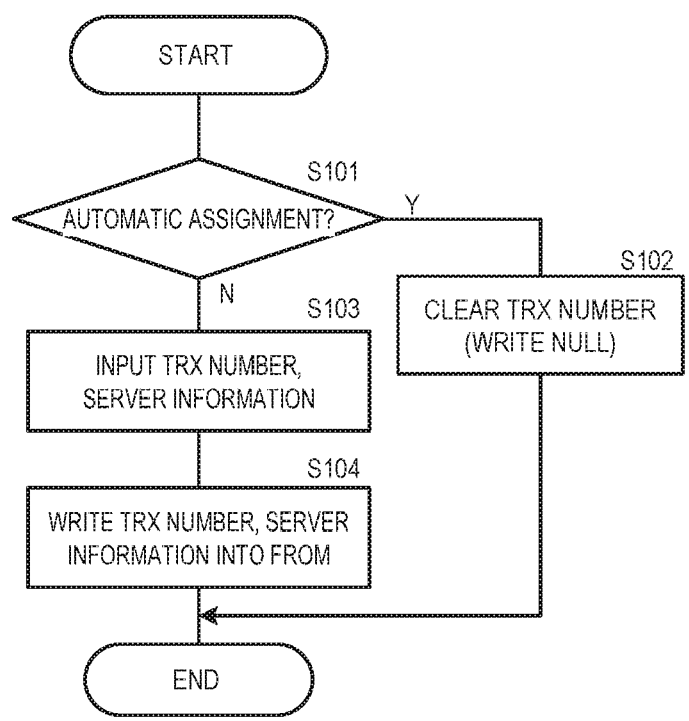
FIG. 11 is a flowchart illustrating writing processing of TRX information to the terminal device.

FIG. 11 is a flowchart illustrating processing of TRX information writing carried out to the terminal device 14. The terminal device 14 is connected to a computer such as the management device 12, and this writing is carried out. First, the terminal device 14 (control unit 20) determines whether an input of the assignment mode of the administrator is automatic assignment or not (S101). If it is the automatic assignment (YES at S101), the terminal device 14 clears the item of the TRX number in the flash ROM 21B or writes the information (Null or the like) indicating the automatic assignment (S102) and finishes the processing. If it is not the automatic assignment (NO at S101), the terminal device 14 receives inputs of the TRX number and the server information (IP address, password and the like) by the administrator (S103), writes the input TRX number and server information in the flash ROM 21B (S104) and finishes the processing.

Figure 12:
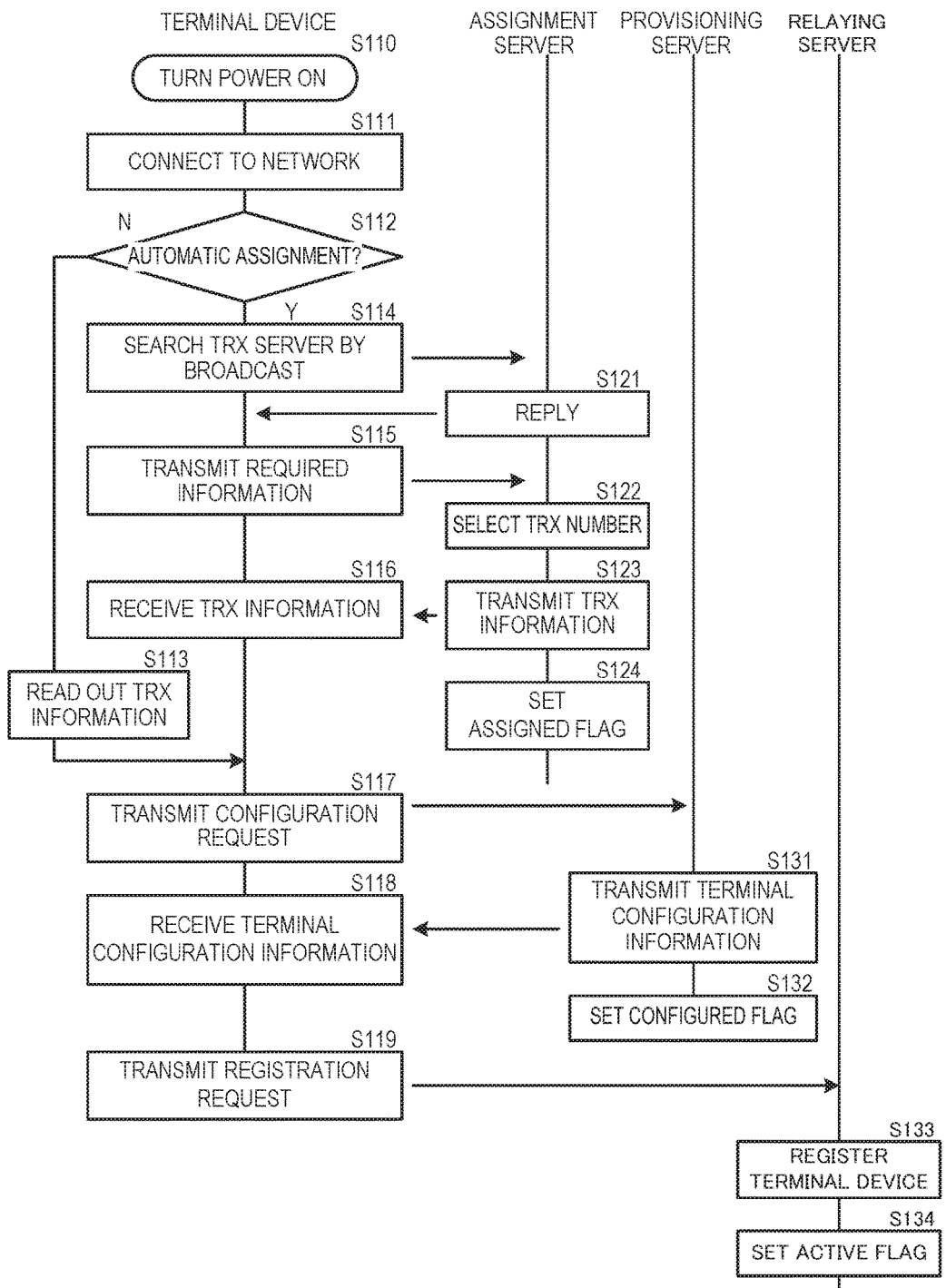
FIG. 12 is a flowchart illustrating a communication procedure of the terminal device and the assignment server.

FIG. 12 is a diagram illustrating a communication procedure with the server 11 from when the terminal device 14 is powered on until the communication is enabled. When the terminal device 14 is powered on (S110), the terminal device 14 reads out the network information stored in the flash ROM 21B into the RAM 21A and connects to the network 17 (S111). Subsequently, the terminal device 14 refers to the TRX number in the flash ROM 21B and determines whether it has content (Null) indicating the automatic assignment or not (S112). If it is not the content indicating the automatic assignment (NO at S112), the process proceeds to S113.

If the TRX number in the flash ROM 21B has the content indicating the automatic assignment at S112 (YES at S112), the terminal device 14 transmits a message, that the assignment server 11A is searched, to the network 17 by broadcast (S114). The assignment server 11A receives it and replies to the terminal device 14 (S121). The terminal device 14 transmits an assignment request of the TRX number in response to this reply and transmits required information such as the MAC address (S115). The assignment server 11A having received this information selects and assigns a predetermined TRX number to this terminal device 14 (S122) and transmits the TRX information including the assigned TRX number and the server information to the terminal device 14 (S123). The assignment server 11A sets an assigned flag corresponding to the assigned TRX number in the TRX table (S124).

At S122, in the case of the static assignment, the assignment server 11A selects the TRX number reserved in advance. In the case of the dynamic assignment, it selects one from unused TRX numbers. At this time, if the MAC address of the terminal device 14 is stored in association with any one of the TRX numbers, the number is selected. In the item of the MAC address of the selected TRX number, the MAC address of the assigned terminal device 14 is written.

The terminal device 14 receives the TRX information from the assignment server 11A at S116. The terminal device 14 makes an access to the provisioning server 11B by using this information and requests configuration (provisioning) (S117). Moreover, if the TRX number written in the flash ROM 21B is not the content indicating the automatic assignment but an actual TRX number at S112, the terminal device 14 reads out the TRX number in the flash ROM 21B and the server information into the RAM 21A (S113) and makes an access to the provisioning server 11B by using this information and requests the configuration (provisioning) (S117).

In response to this, the provisioning server 11B having received the terminal configuration request transmits the terminal configuration information including the terminal number (S131) and sets a configured flag of the terminal configuration table (S132). The terminal device 14 receives this terminal configuration information and writes it in the RAM 21A (S118). The terminal device 14 transmits a registration request to the relaying server 11C (S119). At this time, the terminal device 14 transmits information such as the IP addresses of itself and the wireless access point 13 in connection to the relaying server 11C. The relaying server 11C receives these pieces of information and registers them in the terminal registration table (S133) and sets an active flag in the terminal registration table (S134). As a result, the configuration is completed, and the terminal device 14 can now conduct voice communication with this voice communication system.

Figure 13:
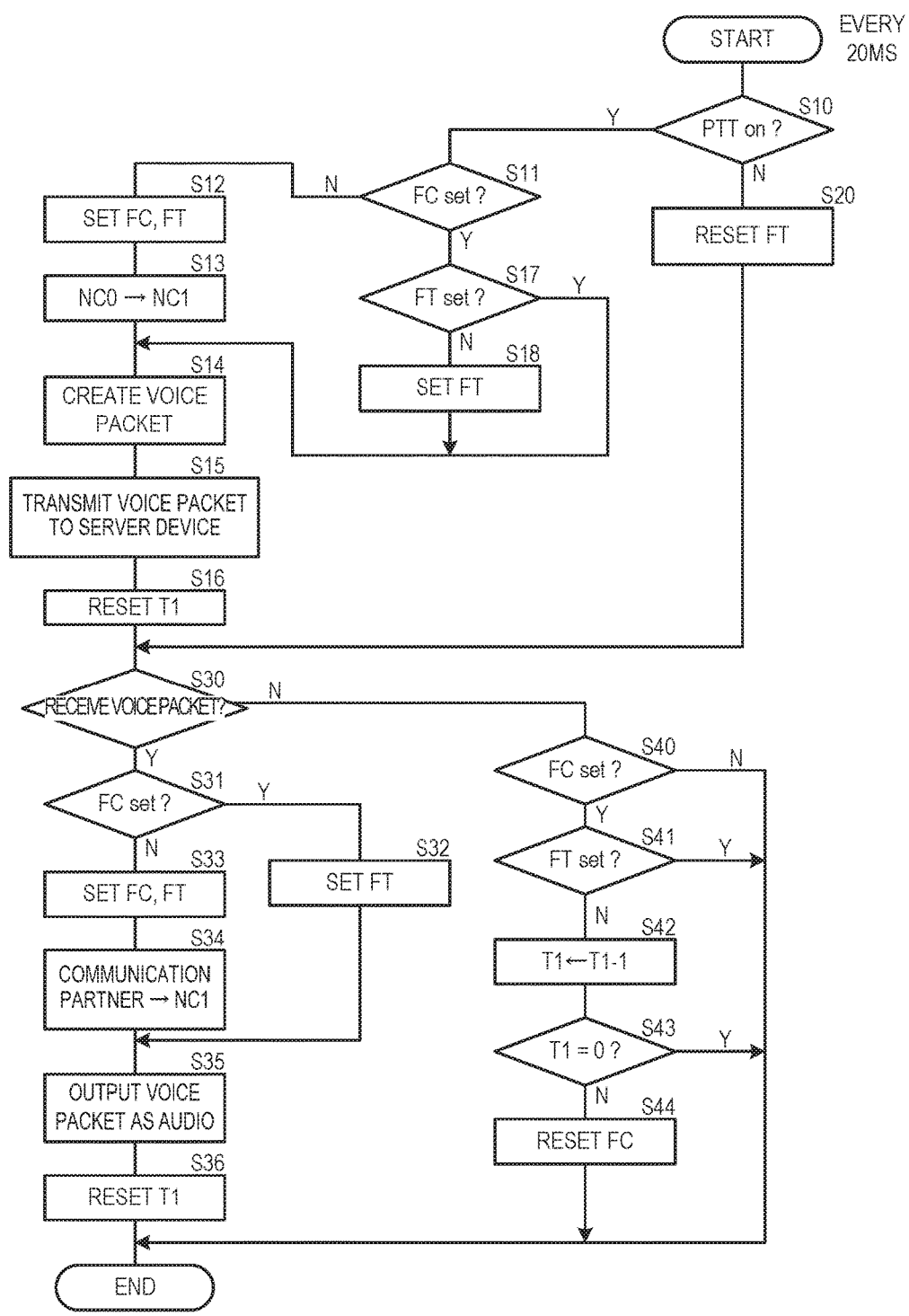
FIG. 13 is a flowchart illustrating an operation of the terminal device.

FIG. 13 is a flowchart illustrating communication control processing executed by the control unit 20 of the terminal device 14. This processing is repeatedly executed every 20 milliseconds. In this processing, a current communication status (status) is determined in accordance with ON/OFF of the PTT switch 220 or reception of a voice packet (RTP packet). Here, flags and timers used in this flowchart are as follows.

PTT: Abbreviation of the push-to-talk switch (PTT switch) 220, but it is not limited to ON/OFF of the PTT switch 220 but also includes ON/OFF of a transmission signal by the VOX circuit.

NC0: An identification number (terminal number/group number) of the communication partner selected by the operation of the user, which is written in the first voice packet (calling voice packet) with which the communication session is established and becomes a session number (NC1).

NC1: A session number (calling ID) and a number identifying the communication session being carried out.

FC: A communication session flag (flag indicating that this terminal device 14 is participating in the communication session).

FT: A during-communication flag (flag indicating that a voice packet is being transmitted or received)

T1: A retention time timer (timer for counting retention time (5 seconds) of a communication session)

S10 to S20 are transmission management processing of a voice packet. The control unit 20 determines a state of the PTT switch 220 (S10). If the PTT switch 220 is ON, the control unit 20 proceeds the processing to S11. If the PTT switch 220 is not ON, it proceeds the processing to S20.

At S11, the control unit 20 determines whether the communication session flag FC has been set or not. If the communication session flag FC has not been set (NO at S11), the voice packet generated by turning-on of the PTT switch 220 this time is a calling voice packet. The control unit 20 sets the communication flag FC and the during-communication flag FT indicating that the voice packet is being transmitted/received (S12). The control unit 20 transcribes the communication partner number NC0 selected by the user to the communication session number NC1 (S13), creates a voice packet in which this communication session number NC1 and a user group number stored in an area 213 are written (S14), and transmits this voice packet to the relaying server 11C (S15). By means of transmission of this calling voice packet, the communication session is started by the relaying server 11C. The control unit 20 resets the retention time timer T1 to 5 seconds (S16) and then, proceeds the processing to reception management processing of the voice packet at S30 and after.

If the communication session flag FC has been already set at S11 (YES at S11), the control unit 20 determines whether the during-communication flag FT has been set or not, that is, whether the voice packet is being transmitted or received at present (S17). If the during-communication flag FT has not been set (NO at S17), the control unit 20 sets the during-communication flag FT (S18). The processing proceeds in the order of S11→S17→S18 when transmission of a new voice packet (talking voice of the user) is started in a state where the communication session which has been already started is maintained. After that, the control unit 20 proceeds the processing to S14.

At S10, if the PTT switch 220 has not been turned on (NO at S10), the control unit 20 resets the during-communication flag FT (S20). It should be noted that, if the during-communication flag FT has been already reset, it may remain as it is. After that, the control unit 20 proceeds the processing to the reception management processing of the voice packet at S30 and after.

The control unit 20 determines whether the voice packet has been received or not over the network 17 at S30. If the voice packet has been received, the control unit 20 proceeds the processing to S31. If the voice packet has not been received, it proceeds the processing to S40.

At S31, the control unit 20 determines whether the communication session flag FC has been set or not. If the communication session flag FC has not been set (NO at S31), it determines that a new communication session has been established this time and its first voice packet has been transmitted and sets the communication session flag FC and the during-communication flag FT (S33). The FT flag is a flag indicating that the voice packet is being transmitted/received at present. The control unit 20 transcribes the communication partner number included in the voice packet to the communication session number NC1 (S34). The control unit 20 outputs the voice packet to the audio circuit 24 (S35) and resets the retention time timer T1 to 5 seconds (S36).

If the communication session flag FC has been already set at S31 (YES at S31), the control unit 20 sets the during-communication flag FT in response to reception of the present voice packet (S32). It should be noted that, if the during-communication flag FT has been already set, it may remain as it is. After that, the control unit 20 proceeds the processing to S35.

If the voice packet has not been received at S30 (NO at S30), the control unit 20 determines whether the communication session flag FC has been set or not (S40). If the communication session flag FC has been set (YES at S40), the control unit 20 executes the processing at S41 and after. If the communication session flag FC has not been set (NO at S40), the control unit 20 finishes the processing as it is.

At S41, the communication unit 20 determines whether the during-communication flag FT has been set or not. If the during-communication flag FT has been set (YES at S41), the control unit 20 finishes the processing as it is. If the during-communication flag FT has not been set (NO at S41), that is, the during-communication flag FT has been reset but the communication flag FC has been set, the control unit 20 subtracts 1 count (for 20 milliseconds) from the retention time timer T1 (S42). Then, it is determined whether the retention time timer T1 has become 0 by this subtraction or not (S43). If the retention time timer T1 has become 0 (YES at S43), the control unit 20 resets the communication session flag FC in order to cancel the communication session (S44). If the retention time timer T1 is still larger than 0 at S43 (NO at S43), the control unit 20 finishes the processing as it is.

Figure 14:
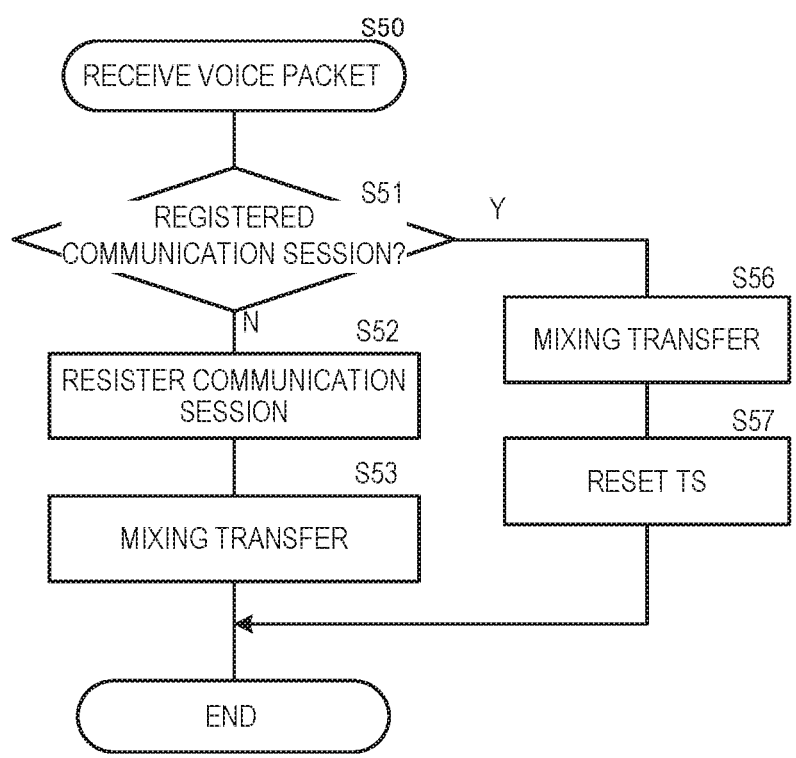
FIG. 14 is a flowchart illustrating an operation of the relaying server.
Figure 15:
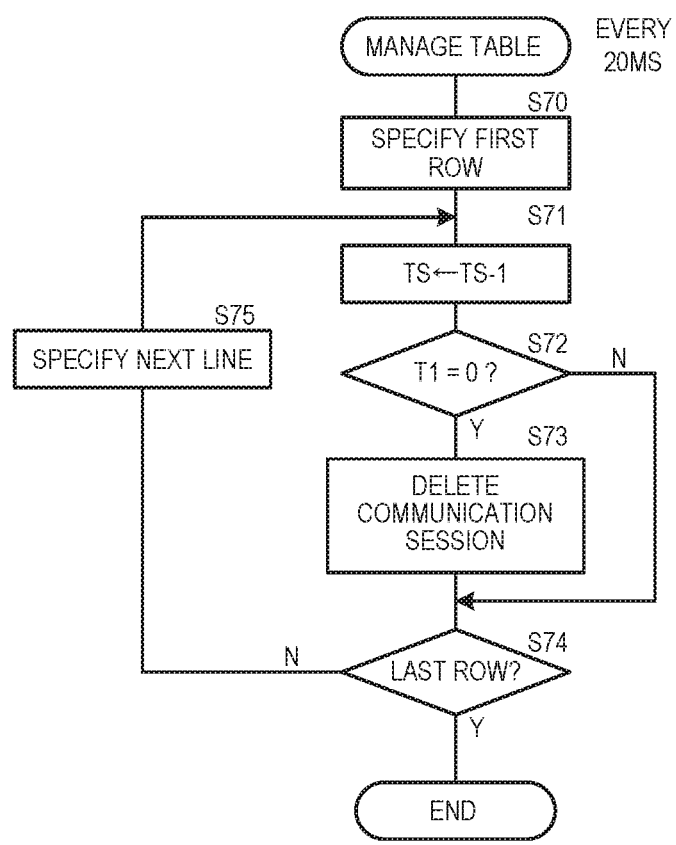
FIG. 15 is a flowchart illustrating the operation of the relaying server.

FIGS. 14 and 15 are flowcharts illustrating an operation of the relaying server 11C. FIG. 14 illustrates processing at reception of the voice packet. FIG. 15 illustrates mixing table management processing.

In FIG. 14, when the control unit 30 of the relaying server 11C receives a voice packet from the terminal device 14 (S50), it determines whether the communication session identified by the source terminal number of the voice packet and the communication partner number has been already registered in the mixing table or not (S51). If the communication session has been already registered in the mixing table (YES at S51), the control unit 30 transfers the voice signal included in the received voice packet to the terminal device 14 participating in the communication session based on the participating terminal number of the mixing table (S56). Then, the retention time timer TS of the communication session in the mixing table is reset to 30 seconds (S57).

If the communication session of the received voice packet is not registered in the mixing table (NO at S51), that is, if this voice packet is a calling voice packet, the control unit 30 registers a new communication session based on this calling voice packet in the mixing table (S52). At this time, the communication partner number is registered as a session number, and the terminal number of the terminal device 14 of the sender of this voice packet is registered as the calling terminal number. As the participating terminal number, the communication partner number and the calling terminal number are registered in the case of the individual communication session, and the calling terminal number and the terminal number of the terminal device 14 belonging to the group of the communication partner number are registered in the case of the group communication session.

The control unit 30 transfers the voice signal of the received voice packet to the terminal device 14 participating in the communication session (S53). The terminal device 14 participating in the communication session is determined from the participating terminal number of the communication session registered in the mixing table.

The mixing table management processing in FIG. 15 is repeatedly executed regularly (every 20 milliseconds, for example). The control unit 30 first specifies the communication session on the first row of the mixing table (S70). The control unit 30 subtracts 1 count (20 milliseconds) from the retention time timer TS of the specified communication session (S71) and determines whether the retention time timer TS has become 0 by this subtraction or not (S72). If the retention time timer TS has become 0 (YES at S62), the control unit 30 determines that this communication has been finished and deletes the communication session on this row (S73). The control unit 30 manages the mixing table by sequentially executing the aforementioned processing until the last row of the mixing table (S74, S75).

Figure 16:
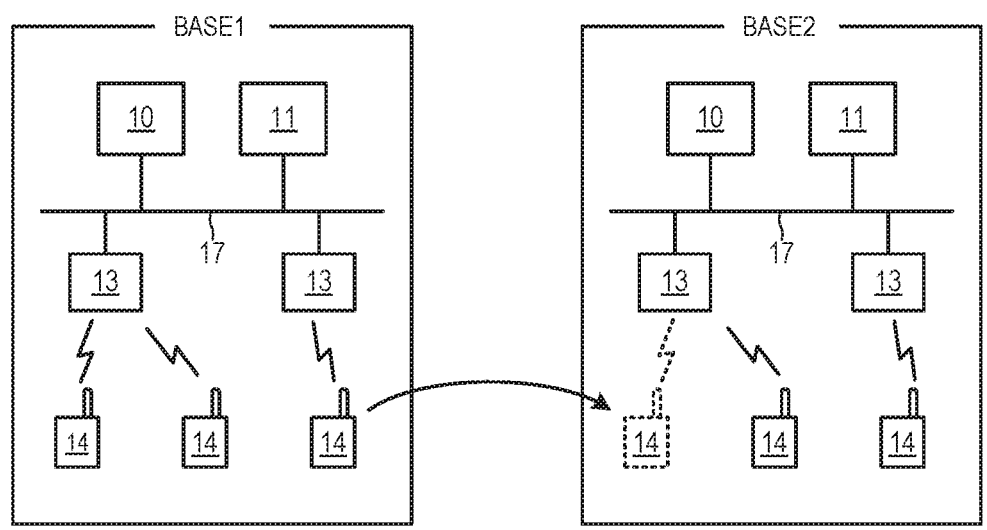
FIG. 16 is the terminal device among a plurality of bases.

As illustrated in FIG. 16, a plurality of the aforementioned voice communication systems are constructed in some cases. That is, a first voice communication system is configured at a base 1 and a second voice communication system at a base 2. Then, some of the terminal devices 14 move back and forth between these bases (base 1, base 2). In the case of such terminal devices 14, by setting the TRX information to the automatic assignment, that is, by making the TRX number blank, the TRX information according to the respective bases (voice communication system) can be received from the assignment servers 11A of the both bases, and it is no longer necessary to manually configure the TRX information at each relocation to another base. However, the network information for connection to the network 17 at each base is preferably configured when it is connected to the network 17 of the previous base before relocated to the base. Each of the bases may be spatially away from each other, or the network 17 may be separated as they are different sections at neighboring locations. The number of bases is not limited to 2.

Figure 17:
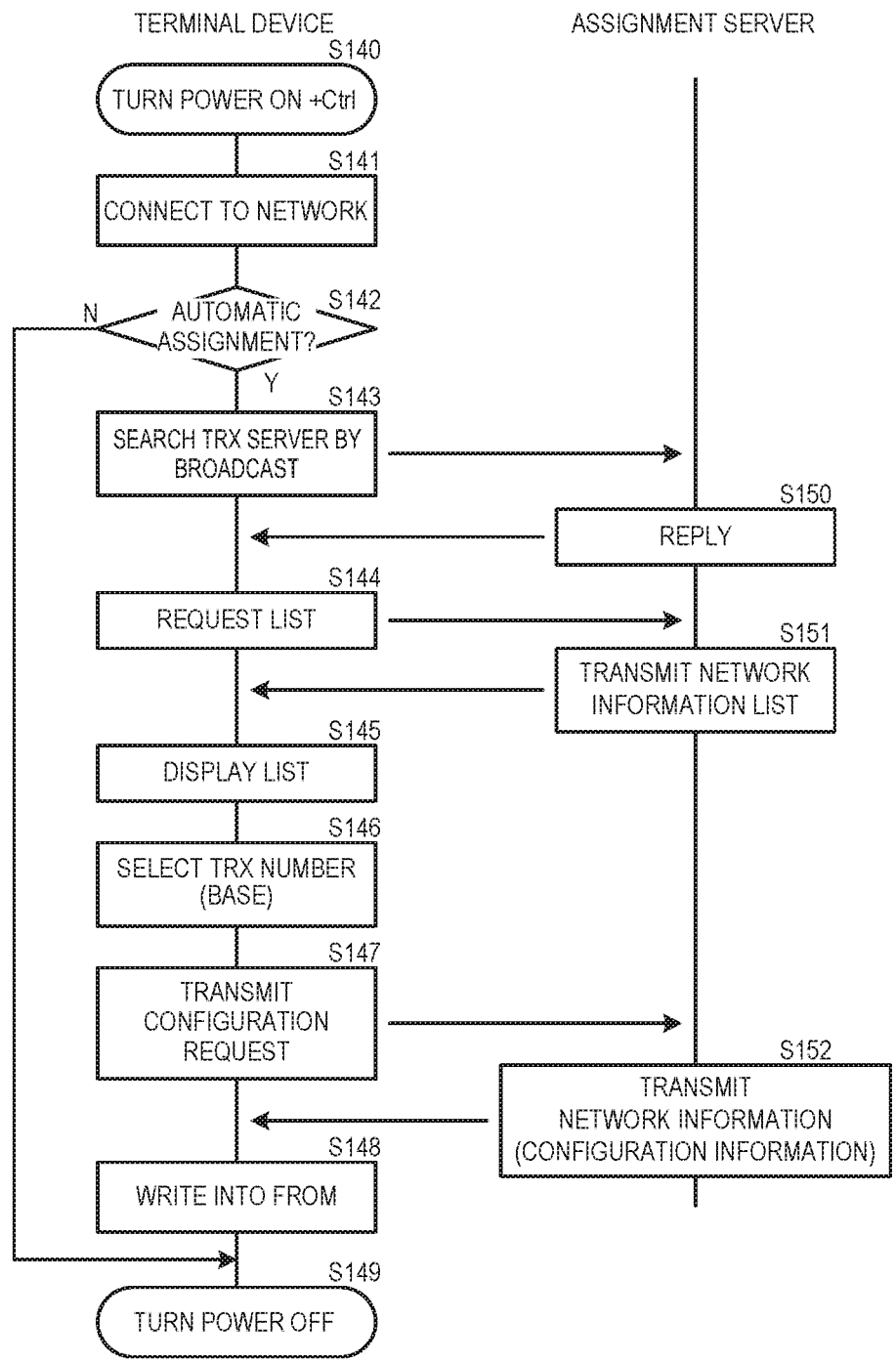
FIG. 17 is a flowchart illustrating a communication procedure of the terminal device and the assignment server.

FIG. 17 is a diagram illustrating a procedure of processing of the terminal device 14 for obtaining the network information from the assignment server 11A. This processing is processing executed while power is on for a short time in order to obtain the network information of the next base. This processing is processing executed by the terminal device 14 which has finished operation at one base and is to be relocated to the next base. This is a diagram illustrating the processing that, after the operation is finished, power is turned off once and then, in order to obtain the network information of the next base, power is turned on again while a control button is pressed (second procedure of the present invention), and an access is made to the assignment server 11A. It should be noted that, a normal operation of powering-on without operating other buttons (at least the control button) corresponds to the first procedure of the present invention.

In FIG. 17, when the terminal device 14 is powered on in a state where the control button is pressed (S140), the terminal device 14 reads out the network information stored in the flash ROM 21B (of this base) into the RAM 21A and connects to the network 17 (S141). Subsequently, it refers to the TRX number in the flash ROM 21B and determines whether the number has the content (Null) indicating the automatic assignment or not (S142). If the TRX number in the flash ROM 21B has the contents indicating the automatic assignment (YES at S142), the terminal device 14 transmits a message, that the assignment server 11A is searched by broadcast, to the network 17 (S143). The assignment server 11A receives this and replies to the terminal device 14 (S150). The terminal device 14 transmits a message to request a list of the network information in response to this reply (S144). The assignment server 11A transmits lists of the dummy TRX numbers (091 to 100 in FIG. 5) and base names (branch names) associated with them in response to that (S151). The terminal device 14 displays the base names (or the TRX numbers and the base names) listed in this list to the display unit 23 (S145), and any one of the bases is selected by the user who saw this display (S146). The terminal device 14 returns the TRX number corresponding to this selected base to the assignment server 11A and requests the terminal configuration (provisioning) (S147). The assignment server 11A carries out provisioning in response to this configuration request (S152). The provisioning is carried out by transmitting the dummy configuration information corresponding to the selected TRX number to the terminal device 14. This dummy configuration information includes the network information of the selected base. The terminal device 14 having received this configuration information writes the received network information in the flash ROM 21B (S148). After the aforementioned processing is finished, the power is turned off by the user (S149), and the processing is finished. The provisioning based on the dummy data is carried out at S152, but it has no problem because, when the power is turned on at the base of the relocation destination, the operation in FIG. 12 is executed, and new configuration information excluding the network information is downloaded. Moreover, if the power is turned on in the state where the control button is being pressed at S140, it may be so configured that the power is automatically turned off at S149. It should be noted that, by displaying the base name on the display unit 23 at S145, selection of the network information (base) is facilitated.

When the power is turned on next time by the aforementioned processing, the terminal device 14 searches the network 17 on the basis of the new network information written in this flash ROM 21B and makes connection.

It should be noted that, if the TRX number is not the content (Null) indicating the automatic assignment at S112 (NO at S112), since the actual TRX information has been written by a manual operation, the processing is finished without executing the processing at S114 to S142. It should be noted that, even in this case (in the case of manual configuration), it may be so configured that the network information can be selected by proceeding to S143. If the actual TRX information has been written, even if the power has been turned on while the control button is pressed, normal start may be made by jumping from S142 to S113 in FIG. 12.

Moreover, it may also be so configured that normal start is made even if the power is turned on in the state where the control button is being pressed. In this case, at S123 in FIG. 12, the assignment server 10A only needs to transmit the TRX number (dynamic assignment/static assignment) selected for this terminal device 14 and the dummy TRX number list together to the terminal device 14. In the TRX number list, the substantial TRX number selected for the terminal device 14 is set as default (head of the list). It may be so configured that, if the terminal device 14 proceeds to the subsequent processing while the predetermined selection operation (the predetermined operation of the present invention) is not performed, this substantial TRX number is automatically selected, and when the dummy TRX number is selected while the list is displayed, the processing at S145 to S149 in FIG. 17 is executed.

REFERENCE NUMERALS 11 server
11A assignment server
11B provisioning server
11C relaying server
12 management device 13 wireless access point
14 terminal device
16 wireless LAN
17 network

What is claimed is:

1. A terminal device comprising:
a network communication unit for processing communication over a first network and a second network;
a control unit having a volatile storage unit and a rewritable non-volatile storage unit; and
an operation unit, wherein
the volatile storage unit stores terminal configuration information,
the non-volatile storage unit stores single network information for connection to the first network or the second network,
when power is turned on by a user input to perform a first procedure of the operation unit for allowing the terminal device to connect to the first network, the control unit reads out first network information from the non-volatile storage unit and connects to the first network so as to make an access to a server on the first network, to obtain the terminal configuration information, and to write the terminal configuration information in the volatile storage unit,
when the power is turned on by the user input to perform a second procedure of the operation unit for configuring the terminal device, the control unit reads out the first network information from the non-volatile storage unit and connects to the first network so as to make an access to the server on the first network, to obtain one second network information selected from a plurality of second network information stored in the server on the first network by an operation of the operation unit for connection to a second network, and to overwrite and store the one second network information in the non-volatile storage unit as the network information,
the second network is different from the first network, and communication under the second network is independent from communication under the first network, and
in the second procedure of the operation unit, the one second network information is obtained and stored in the non-volatile storage unit before the terminal device enters in the second network.

2. The terminal device according to claim 1, wherein
the server includes an assignment server and a provisioning server,
when power is turned on by the first procedure, the control unit makes at first an access to the assignment server so as to obtain an identification code of the terminal device, and then makes an access to the provisioning server so as to obtain the terminal configuration information corresponding to the identification code, and
when the power is turned on by the second procedure, the control unit makes an access to the assignment server so as to obtain the one second network information.

3. A terminal configuration system comprising:
a first server installed on a first network;
a second server installed on a second network; and
a terminal device connectable to the first and second networks, wherein
the first server stores terminal configuration information for the first network information and a plurality of second network information for connection to the second network,
the terminal device comprises:
a volatile storage unit in which the terminal configuration information is written;
a rewritable non-volatile storage unit in which single first network information for connection to the first network is stored as the network information; and
an operation unit,
when power is turned on by a user input to perform a first procedure of the operation unit for allowing the terminal device to connect to the first network, the terminal device reads out the first network information from the non-volatile storage unit and connects to the first network so as to obtain the first terminal configuration information from the first server and to write the first terminal configuration information in the volatile storage unit,
when the power is turned on by the user input to perform a second procedure of the operation unit for configuring the terminal device, the terminal device reads out the single first network information from the non-volatile storage unit and connects to the first network so as to obtain one second network information selected from the plurality of second network information by an operation of the operation unit for connection from the first server and to overwrite and store the one second network information in the non-volatile storage unit as the network information,
the second network is different from the first network, and communication under the second network is independent from communication under the first network, and
in the second procedure of the operation unit, the one second network information is obtained and stored in the non-volatile storage unit before the terminal device enters in the second network.

4. The terminal configuration system according to claim 3, wherein
the first server includes:
an assignment server for giving an identification code to the terminal device; and
a provisioning server for supplying the terminal configuration information to the terminal device,
when power is turned on by the first procedure, the terminal device makes at first an access to the assignment server so as to obtain an identification code of the terminal device, and then makes an access to the provisioning server so as to obtain the first terminal configuration information corresponding to the identification code, and
when the power is turned on by the second procedure, the terminal device makes an access to the assignment server and obtains the one second network information.

5. A terminal configuration method, wherein
in a voice communication system having:
a first relaying server installed on a first network and relaying voice communication between terminal devices connected to the first network, a first provisioning server for supplying the terminal device with terminal configuration information for allowing the voice communication by accessing the first replay server through the first network, a first assignment server for giving identification information to the terminal device and for providing first server information for making an access to the first provisioning server to the terminal device;
a second relaying server installed on a second network and relaying voice communication between the terminal devices connected to the second network, a second provisioning server for supplying the terminal device with the terminal configuration information for allowing the voice communication by accessing the second relay server through the second network, a second assignment server for giving the identification information to the terminal device and for providing second server information for making an access to the second provisioning server to the terminal device, the second network being different from the first network, communication under the second network being independent from communication under the first network, the second provisioning server being different from the first provisioning server, the second assignment server being different from the first assignment server; and the terminal device comprising a rewritable non-volatile storage unit for storing network information for connection to the first network or the second network and a volatile storage unit in which the terminal configuration information is written, the method including:

allowing the first assignment server further to store second network information for connection to the second network;

allowing the second assignment server further to store first network information for connection to the first network;

in a cover area of the first network, based on a user input from the terminal device, performing a procedure for connecting the terminal device, in which the first network information is stored in the non-volatile storage unit as network information, to the first network on the basis of the first network information stored in the non-volatile storage unit so as to obtain the second network information from the first assignment server and to overwrite and store in advance the second network information in the non-volatile storage unit before the terminal device enters in the second network;

after moving from the cover area of the first network into a cover area of the second network, connecting the terminal device to the second network on the basis of the second network information stored in the non-volatile storage unit obtained before entering to the cover area of the second network, so as to obtain the second server information from the second assignment server and to make an access to the second provisioning server;

obtaining the terminal configuration information from the second provisioning server; and making an access to the second relaying server by using the terminal configuration information.

* * * * *